United States Patent
Anand et al.

(10) Patent No.: US 8,062,685 B2
(45) Date of Patent: Nov. 22, 2011

(54) DIRECT EXPANDED SNACK MADE WITH PEANUT FLOUR AND METHOD FOR MAKING

(75) Inventors: Ashish Anand, Plano, TX (US); Lewis Conrad Keller, McKinney, TX (US); V. N. Mohan Rao, Plano, TX (US)

(73) Assignee: Frito-Lay North America, Inc., Plano, TX (US)

( * ) Notice: Subject to any disclaimer, the term of this patent is extended or adjusted under 35 U.S.C. 154(b) by 758 days.

(21) Appl. No.: 11/696,016

(22) Filed: Apr. 3, 2007

(65) Prior Publication Data

US 2008/0248179 A1    Oct. 9, 2008

(51) Int. Cl.
A23P 1/14    (2006.01)

(52) U.S. Cl. .................................... 426/559; 426/516

(58) Field of Classification Search ................ 426/625
See application file for complete search history.

(56) References Cited

U.S. PATENT DOCUMENTS

| | | | |
|---|---|---|---|
| 3,605,649 A * | 9/1971 | Bundus | 425/97 |
| 4,468,364 A | 8/1984 | Ide | |
| 4,869,911 A | 9/1989 | Keller | |
| 5,419,696 A * | 5/1995 | Henson | 425/382.4 |
| 5,500,239 A | 3/1996 | Hayward | |
| 5,620,722 A | 4/1997 | Spina | |
| 5,686,128 A | 11/1997 | Tracy et al. | |
| 5,811,048 A * | 9/1998 | Dunn et al. | 264/177.11 |
| 5,993,869 A | 11/1999 | Freeport | |
| 6,605,309 B2 | 8/2003 | Freeman et al. | |
| 6,607,772 B1 | 8/2003 | Bortone | |
| 6,850,810 B1 | 2/2005 | Wang et al. | |
| 7,235,276 B2 * | 6/2007 | Allen et al. | 426/549 |
| 2001/0019732 A1 * | 9/2001 | Roussel et al. | 426/89 |
| 2003/0026890 A1 | 2/2003 | Freeman et al. | |
| 2004/0121062 A1 | 6/2004 | Akashe et al. | |
| 2004/0216619 A1 * | 11/2004 | Hunter | 99/353 |
| 2005/0061314 A1 | 3/2005 | Davies et al. | |
| 2006/0013934 A1 * | 1/2006 | Villagran et al. | 426/549 |
| 2006/0019009 A1 * | 1/2006 | Keller et al. | 426/516 |

OTHER PUBLICATIONS

Ayres et al., Processing of Edible Peanut Flour and Grits, May 1973, Springer Berlin/ Heidelberg, vol. 51, pp. 133-136.*

* cited by examiner

*Primary Examiner* — D. Lawrence Tarazano
*Assistant Examiner* — Jenna A Watts
(74) *Attorney, Agent, or Firm* — Bobby W. Braxton; James R. Gourley; Carstens & Cahoon, LLP

(57) ABSTRACT

A method for making a direct expanded snack piece shaped like a peanut is disclosed. Ingredients comprising peanut flour, ground corn product, rice flour and oat flour are introduced into an extruder. The ingredients are hydrated and extruded through an orifice adapted to produce a puffed snack piece shaped like a peanut and cut into puffed snacks. The puffed snacks are dried and seasoned.

21 Claims, 3 Drawing Sheets

DIRECT EXPANDED SNACK MADE WITH PEANUT FLOUR AND METHOD FOR MAKING

BACKGROUND OF THE INVENTION

1. Technical Field

The present invention relates to a method for making an improved direct expanded snack food and, more particularly, to a method for making a direct expanded or puffed extrudate having high contents of protein and healthy oils with a real peanut taste and shape, and texture characteristics similar to conventionally produced puffed snack products.

2. Description of Related Art

Puffed snack food products are popular consumer items for which there exists a great demand. Snacks can also play a large role in the diet of consumers, and consumer demand for healthy snacks has dramatically increased. Peanuts and other types of nuts are a preferred food item from a nutrition standpoint due to their high protein content and healthy oil content. Many nuts also have high fiber content, which has been attributed to reducing a person's risk of certain cancers, diabetes, digestive disorders, and heart diseases, as well as aiding weight management. Studies have also shown that people who consume nuts on a regular basis are less likely to suffer from coronary heart disease and can lower their LDL cholesterol levels, probably due to the fatty acid profile of nuts.

A healthy, nutritious snack should ideally meet several criteria that include limits on fat, including saturated and trans-fatty acids, cholesterol, sodium, and added sugar. Preferably, the criteria should also include products formulated to have specific health or wellness benefits. Specifically, a nutritious snack might contain, per 1 ounce serving, no more than 5 g of fat, 1 gram or less of saturated fat, zero trans-fatty acids, less than 25% calories from added sugar, and no more than 240 milligrams of sodium.

Although peanuts can be consumed raw or cooked in their natural form, some people find that consuming whole peanuts is undesirable due to their hard, chewy texture. It would be an improvement in the snack industry, therefore, to provide consumers with a peanut-based snack product with a lighter, crispier texture than whole nuts.

Prior art direct expanded products, such as snacks produced and marketed under the Cheetos® brand label, are typically made by extruding corn meal and/or other raw materials through a die having a small orifice at high temperature and pressure. The water vapor pressure in the hot extrudate causes expansion, or puffing of the extrudate as it exits the small orifice. As disclosed in U.S. Pat. No. 6,607,772, assigned to the same assignee of the present invention, the typical ingredients for the starting raw material consists of corn meal and water, and the typical extrudate is a cylindrical "rod" shape because the typical die orifice is circular in shape. Also, as noted in U.S. Pat. No. 6,607,772, product shape and appearance is an important factor considered by consumers of snacks.

It would be an improvement in the art, therefore to provide an extruded, puffed, peanut-based snack with a high nutritional value, shaped like a peanut, and which simulates the organoleptical properties, including texture, of a conventionally produced puffed snack product.

SUMMARY OF THE INVENTION

The present invention provides a great tasting, healthy, extruded, puffed snack piece having a high content of peanut solids and a light, crispy texture. Peanut solids are incorporated into the puffed snack piece by including peanut flour as an ingredient. In one aspect of the invention, partially defatted peanut flour (preferably containing less than about 15% fat and more than about 45% protein by weight) is used as a healthy ingredient in the extruded, puffed snack pieces of the present invention. The peanut flour provides good taste, texture and nutritional benefits to the consumer. In another aspect of the invention, additional ingredients are combined with the peanut flour to produce a dough that expands well to give the desired product texture, flavor and nutritional goals. The additional ingredients include rice flour, corn meal, corn oil, oat bran, soy protein isolate and water.

In another aspect of the invention, extruder properties are chosen that produce a puffed snack piece that is shaped like a peanut. These properties include the extruder screw revolutions per minute, barrel temperatures and orifice shape. These as well as additional features and advantages of the present invention will become apparent in the following written description.

BRIEF DESCRIPTION OF THE DRAWINGS

The novel features believed characteristic of the invention are set forth in the appended claims. The invention itself, however, as well as a preferred mode of use, further objectives and advantages thereof, will be best understood by reference to the following detailed description of illustrative embodiments when read in conjunction with the accompanying drawings, wherein:

DETAILED DESCRIPTION

Figure 1:
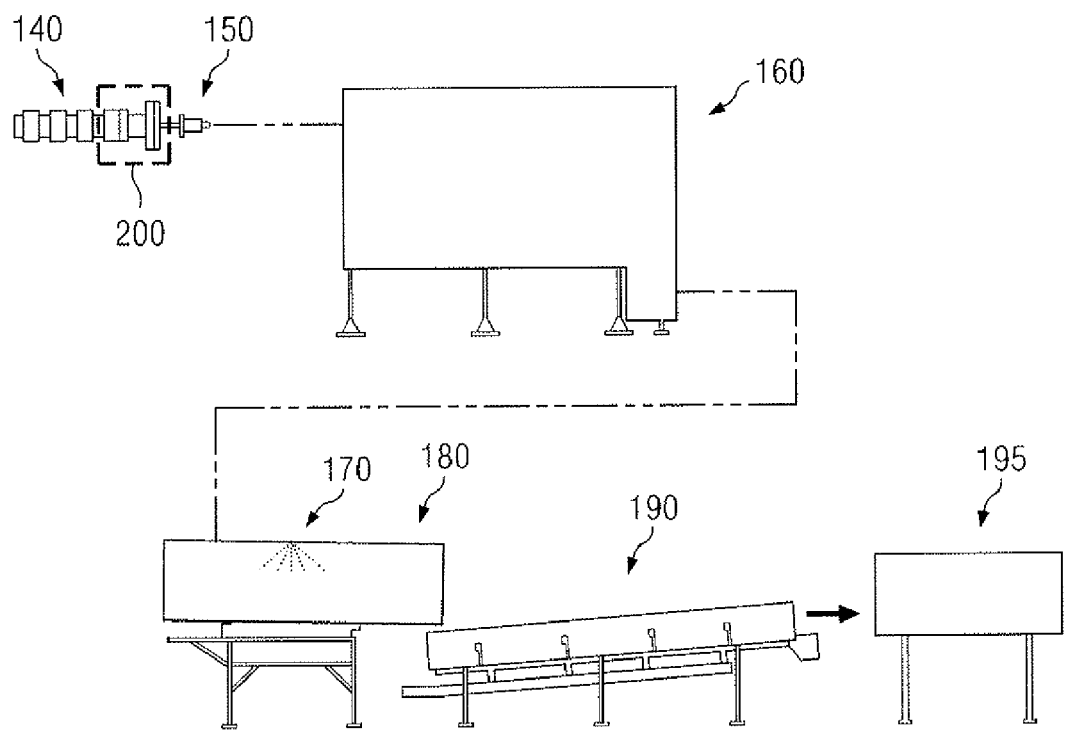
FIG. 1 is a schematic of the apparatus used for making the puffed snack product of the present invention.

The puffed snack pieces of the present invention are extruded nut-based snacks that are shaped like peanuts, contain peanut flour and have a light, crispy texture. The nutritional goals for one embodiment of the snack pieces of the present invention include, per 1 ounce serving of snack pieces: no more than 5 grams of fat, 1 gram or less of saturated fat, zero trans-fatty acids, less than 25% calories from added sugar, and no more than 240 milligrams of sodium and at least 5 grams of protein.

The snack chips of the present invention are preferably prepared from ingredients comprising rice flour, ground corn raw material such as corn meal, peanut flour, soy protein isolate and oat bran (oat fiber). A ground corn product, such as degermed yellow corn meal, available from Bungee Milling of Danville, Ill. can be used. As used herein, a ground corn product is defined as a substantially ground corn kernel product and includes, but is not limited to, corn meal, corn flour, corn starch and mixtures thereof. Soy protein isolate is prepared by removing most of the water soluble, non-protein constituents from dehulled and defatted soybeans, and typically comprises about 90% protein. A soy protein isolate such as ProFam 880, available from ADM of Decatur, Ill. can be used. As used herein, soy protein isolate is defined as a protein mixture derived from a soybean having at least 90% protein by weight on a wet basis. Rice flour is rice that has been ground, pulverized, or otherwise processed to yield small particles of rice. The rice flour used in the present invention is preferably a native rice flour. A rice flour such as RF-L00080, available from Sage V Foods of Los Angeles, Calif. can be used. Oat bran is made from the hard outer layer of the oat cereal grain and is high in fiber. Oat bran or oat fiber, as used herein, is defined as pieces of the hard outer layer of oats. An oat fiber that can be used with the present invention is Opta-780 oat bran, available from Canadian Harvest of Cambridge, Minn.

Partially defatted peanut flour is typically made by grinding and screening peanut flakes either before or after removal of peanut oil. The ground peanuts can be raw, lightly roasted, or roasted, but are preferably lightly roasted peanuts. The partially defatted peanut flour used in the present invention preferably comprises at least about 45% protein and less than about 15% fat. As used herein, peanut flour is defined as a mixture of nut particles, wherein almost all of the nut particles pass through a #40 Mesh Screen based on the U.S. Sieve Scale. A U.S. #40 Mesh Screen has openings sized approximately 0.42 millimeters. A preferred nut particle size distribution for the nut flour is as follows: about 0.3% retained on a #40 Mesh Screen; about 1.8% retained on a #60 Mesh Screen; about 4.1% retained on a #80 Mesh Screen; about 4.4% retained on a #100 Mesh Screen; and about 95.6% passing through a #100 Mesh Screen. All Mesh Screen sizes are based on the U.S. Sieve Scale and the opening size for each Mesh Screen is summarized in the following table:

| U.S. Sieve # | Opening Size | |
| --- | --- | --- |
|  | Millimeters | Inches |
| 40 | 0.420 | 0.0165 |
| 60 | 0.250 | 0.0098 |
| 80 | 0.177 | 0.0070 |
| 100 | 0.149 | 0.0059 |

In one embodiment, ingredients comprising about 15% to about 25% peanut flour, about 35% to about 50% rice flour, about 25% to about 35% ground corn product, and about 1% to about 3% oat fiber are mixed to form a dry ingredient mixture. In another embodiment, ingredients comprising about 15% to about 25% peanut flour, about 35% to about 45% rice flour, about 25% to about 35% ground corn product, about 5% to about 10% soy protein isolate, and about 1% to about 3% oat fiber are mixed together to form a dry ingredient mixture. It is understood by one skilled in the art that the dry ingredient mixture may have some intrinsic moisture content.

FIG. 1 is a schematic of the apparatus used for making the puffed snack product of the present invention. In one embodiment, the dry ingredient mixture is metered continuously into an extruder 140. The ingredients can be pre-mixed or added separately to and mixed inside a twin screw extruder. In another embodiment, a single screw extruder is used.

The ingredients can be hydrated prior to entry into or while inside a twin screw extruder 140. In one embodiment, the extruder 140 is operated at a screw speed of about 200 to about 450 revolutions per minute (RPM) and water is added until the ingredients inside the extruder achieve until a total moisture content of between about 15% and about 30%. A moisture content lower than 15% tends to cause higher extrudate temperatures, which can result in subsequent undesirable off flavors. A BC-45 twin screw extruder, available from Clextral Inc, of Tampa, Fla. can be used.

Figure 2:
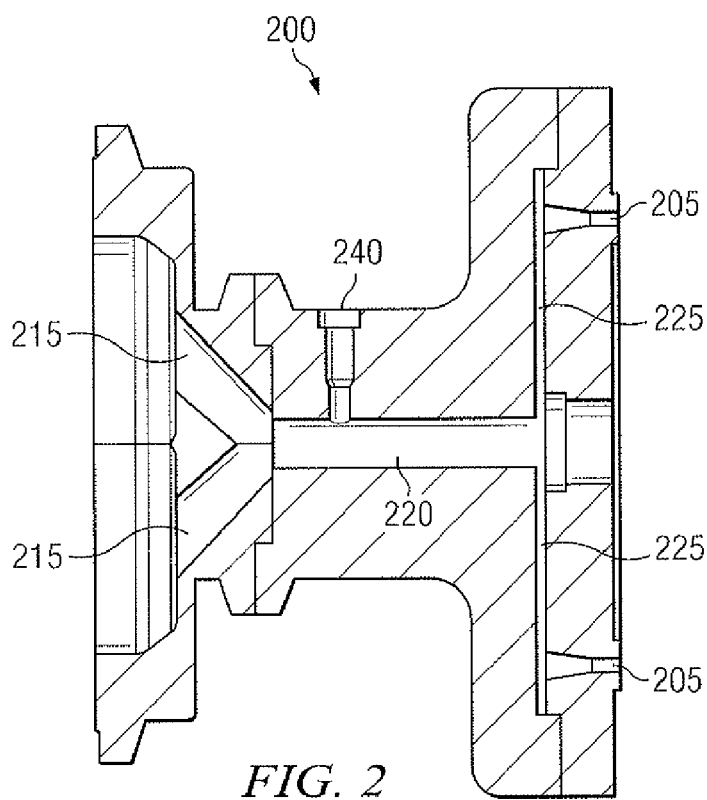
FIG. 2 is a schematic cross section of a die assembly mounted on the end of a twin screw extruder.

FIG. 2 is a cross section of a die assembly 200 mounted on the end of a twin screw extruder. Inside the die assembly 200, the ingredients travel out of the extruder screw channels 215 as a viscous melt, converge into a central channel 220, travel into a radial channel 225 and out the die exit 205. The viscous melt flows through the die assembly 200 at a temperature of between about 320° F. to about 410° F., or more preferably between about 330° F. and about 400° F. The viscous melt is forced from the extruder screw channels 215 through the central channel 220 and radial channel 225 toward the die exit 205 at a die pressure between about 500 and about 2000 pounds per square inch (psi), or more preferably between about 600 psi and about 1500 psi. As used herein, die pressure is the pressure of the viscous melt after the extruder screws but prior to reaching atmospheric pressure conditions and can be measured in the central feed channel 220 using instrumentation placed into a temperature/pressure sensor port 240. As used herein, extrudate temperature is the temperature of the raw materials just after the extruder screws, which can also be measured in the central feed channel 220 using instrumentation placed into the temperature/pressure sensor port 240. The raw materials then exit through a die exit 205 in an orifice plate 250 to atmospheric pressure and ambient temperature. Upon passing through the die exit 205, the extrudate expands, flashes vapor, cools, and very quickly goes from a flowable plastic melt stage to a relatively rigid, glassy structure typical of a puffed snack.

Figure 3:
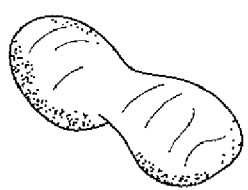
FIG. 3 is a perspective view of a peanut-shaped snack puff made from one embodiment of the present invention.
Figure 4A:
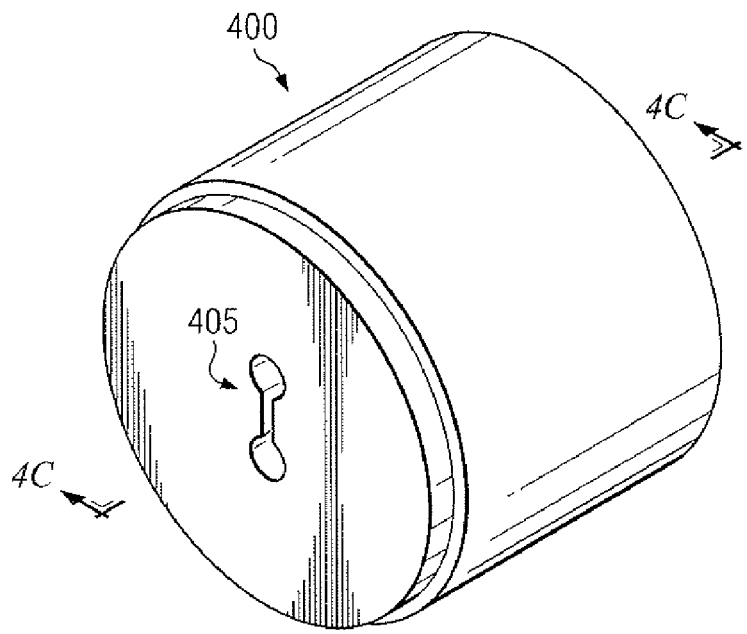
FIG. 4A is a perspective view of the die insert of one embodiment of the present invention.

FIG. 3 is a perspective view of the peanut-shaped snack puffs of the present invention. The "peanut shape" of the snack puffs, as that term is used herein, is generally similar to the shape of a whole peanut pod after harvesting but before being split open to reveal the peanut seeds inside. In order to obtain an extrudate that can be cut into the peanut shape depicted in FIG. 3, a die insert 400 having a novel orifice shape, depicted in FIG. 4A, is used in conjunction with the die exit 205 of the orifice plate 250 depicted in FIG. 2. Prior art die inserts (not shown) typically have an orifice shape that is circular in cross section. Because a circular orifice will not produce a peanut shaped snack, the die insert 400 of the present invention utilizes a uniquely shaped orifice 405 which produces an extrudate that forms a peanut-shaped snack puff when the extrudate is cut after passing through the orifice 405. The novel orifice shape of the present invention can be used with different extruders and die assemblies to produce the peanut shaped snacks of the present invention. Different extruders, die assemblies and processing conditions can be chosen to balance the flow through the orifice to varying degrees and produce a puffed snack having a smoother, rougher, rounder or flatter surfaces, depending on the particular product characteristics desired.

Figure 4B:
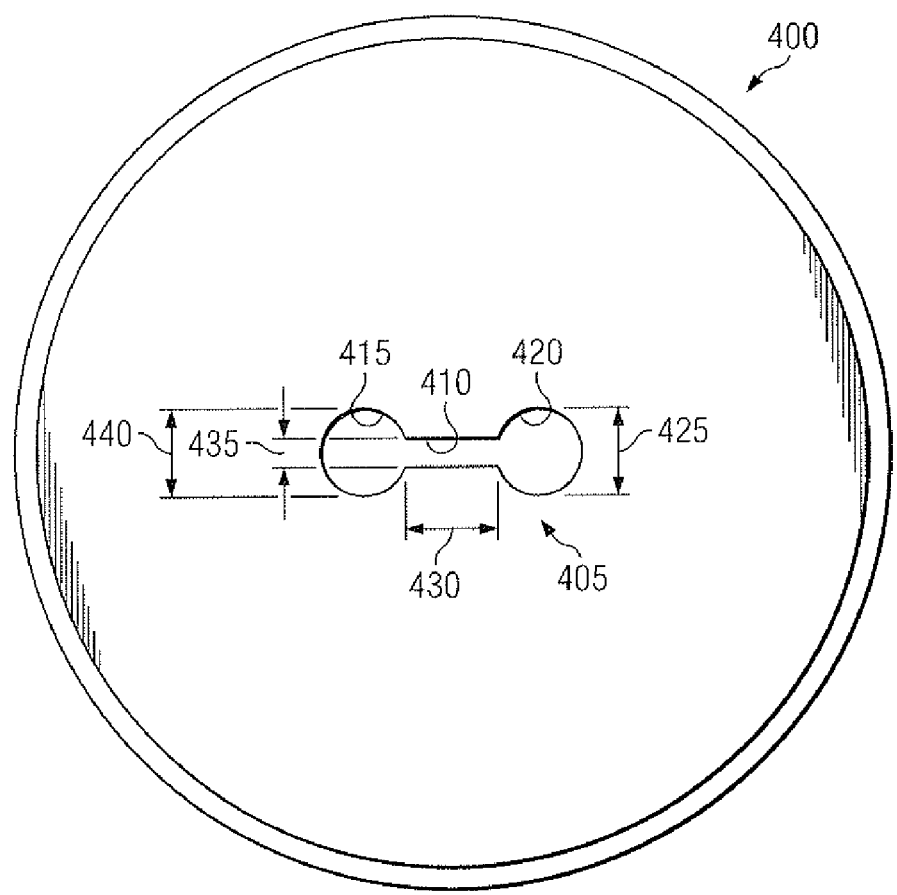
FIG. 4B is a frontal view of the die insert of one embodiment of the present invention.

Referring to FIG. 4B, the cross section of the orifice shape is defined by a perimeter having a unique shape that generally comprises two approximately parallel linear portions 410 interposed between two diametric portions 415 and 420. Each diametric portion 415 and 420 of the orifice perimeter shape has a diameter 425 and 440. The linear portions 410 of the orifice perimeter shape have a width 435 separating them, and a length 430. The length 430 of the linear portions 410 is defined as the distance from one diametric portion 415 to the other diametric portion 420. The width 435 separating the linear portions 410 is preferably less than the diameters 425 and 440 of the diametric portions 415 and 420. In one embodiment, the width 435 separating the linear portions 410 is between about 5 millimeters and about 12 millimeters.

In another embodiment, the linear portions 410 are between about 9 millimeters and about 14 millimeters in length. In still another embodiment, the diametric portions 415 and 420 each have a diameter between about 12 millimeters and about 18 millimeters.

In one embodiment, the two diametric portions 415 and 420 have approximately equal diameters 425 and 440. The resultant cross section of the orifice 405 resembles the lengthwise cross section of a dumbbell. In another embodiment, one of the diametric portions 415 has a diameter 440 that is between about 5% and about 15% smaller than the diameter 425 of the other diametric portion 420, which in some cases helps balance the flow through the orifice 405. In still another embodiment, one of the diametric portions 415 can instead be an elliptical portion with its major axis approximately parallel to the length 430 of the linear portions 410, which causes the orifice 405 to produce a snack puff with a more realistic peanut shape.

Figure 4C:
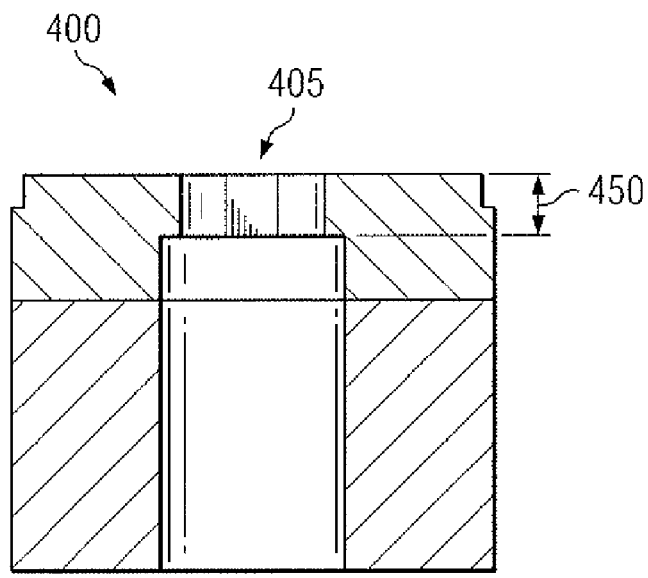
FIG. 4C is a schematic cross section of the die insert of one embodiment of the present invention.

The shape of the orifice cross section is not the only property of the orifice that affects the snack puff shape. Referring to FIG. 4C, it has also been found that using an orifice 405 with a particular land length 450 is important to produce a snack puff that is rounded off at the area where the extrudate is cut upon exiting the orifice 405. FIG. 4C is a cross section of the die insert 400 of the present invention and depicts the land length 450 for the orifice 405. The land length, as used herein, is defined as the length through which the orifice maintains a constant cross-sectional area. The land length affects the roundness of the shape of the puffed snack where the extrudate is cut. The preferred land length 450 is between about ⅛ inch and about ½ inch, and the most preferable land length 450 is about ¼ inch. Using an orifice 405 with a land length 450 of ¼ inch produces a puffed snack with appropriately rounded sections where the extrudate is cut sufficient to impart the desired peanut shape.

Figure 4D:
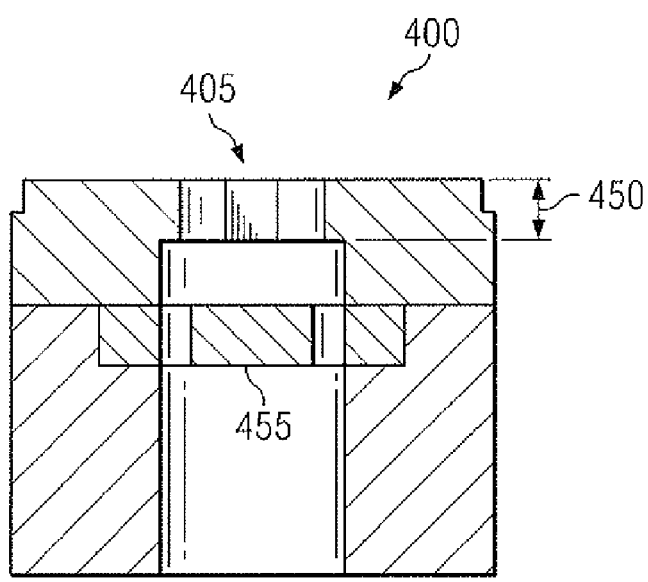
FIG. 4D is a schematic cross section of the die insert of another embodiment of the present invention having a diffuser plate.

In addition to the uniquely shaped orifice 405, the die insert of another embodiment of the present invention (referring to FIG. 4D) utilizes a diffuser plate 455 (which is sometimes referred to in the art as a breaker plate) to improve the extrudate flow through the orifice 405. The raw ingredients flow around the diffuser plate 455 before flowing through the orifice 405, which helps balance and control the flow through the orifice 405.

Referring back to FIG. 1, immediately upon exiting the die assembly 200, the extrudate can be cut by rotary cutting apparatus 150 into peanut-sized pieces. Preferably, the cutting apparatus 150 cuts across the orifice through the shortest possible distance. In other words, referring to FIG. 4B, a cutting blade (not shown) preferably cuts across both diametric portions at approximately the same time in order to produce a more realistic peanut shape.

The moisture content of the snack puff after it exits the extruder is about 4% to about 12%, which can be too high to maintain desirable texture and crispness for extended periods of time. The puffed snack, in one embodiment, can be routed along conveyors and can be dehydrated to a moisture content of between about 0.8% to about 2.0% or more preferably between about 0.8% to about 1.2% by weight of the product. Referring to FIG. 1, the puffed snack can be dehydrated, for example, in a drying oven 160 at a temperature between about 250° F. and about 325° F. for about 5 to 12 minutes. Higher temperatures should be avoided to prevent undesirable off-flavors. In an alternative embodiment, the puffed snack, upon exiting the extruder die can be air dried or fried, and then seasoned as required. In another embodiment, the puffed snack, upon exiting the extruder die can be sent directly to a seasoning applicator prior to being dehydrated to a moisture content of between 0.8 to about 1.2% by weight of the product.

The seasoning applicator 170 can impart flavors including, but not limited to, peanut or peanut butter. These flavors can be imparted by including peanut flour in the seasoning. To enhance the visual appeal of the puffed snack, visible pieces of peanut can be included in the seasoning. In addition, the seasoning can comprise nutrients including, but not limited to, vitamins and minerals. The seasoning applicator 170 can be any seasoning applicator known in the art, for example, a rotating seasoning drum 180 of the type typically used to commercially apply seasoning to snacks.

The puffed snack of the present invention comprises numerous air pockets or void spaces interspersed within the puffed snack giving it a high porosity. Depending on the particular processing conditions chosen, some embodiments of the present invention produce dried, unseasoned puffed snacks having a packaging bulk density between about 0.05 grams per cubic centimeter and about 0.20 grams per cubic centimeter. Packaging bulk density is determined by filling a container of known volume with puffed snacks, measuring the mass of the puffed snacks that fill the container, and dividing the mass of the puffed snacks by the volume of the container.

The seasoned puffed snack can be cooled on conveyors 190 as it is routed to be packaged 195. In one embodiment, the puffed snack comprises between about 10% and about 18% of seasoning by dry weight of the product.

Hence, this invention produces a direct expanded or puffed snack and method for making whereby a peanut-shaped puffed snack food is made that has a high content of peanut flour and protein, a peanut like taste, and texture characteristics of conventionally produced puffed snack products. In addition, the snack puffs disclosed herein meet or exceed the other preferred nutritional goals discussed above. Specifically, the snack puffs disclosed have, per 1 ounce serving, less than 5 grams of fat, 1 gram or less of saturated fat, zero trans-fatty acids, less than 25% calories from added sugar, and no more than 240 milligrams of sodium.

While this invention has been particularly shown and described with reference to a preferred embodiment, it will be understood by those skilled in the art that various changes in form and detail may be made therein without departing from the spirit and scope of the invention.

What is claimed is:

1. A method for making puffed snacks comprising:
introducing into an extruder ingredients comprising by weight on a dry basis:
about 15% to about 25% peanut flour;
about 35% to about 50% rice flour;
about 25% to about 35% ground corn product; and
about 1% to about 3% oat fiber
forming an extrudate by extruding said ingredients through said extruder, wherein said extruder further comprises:
at least one die exit;
an orifice disposed in each said die exit, said orifice comprising:
a cross-sectional perimeter defined by two approximately parallel linear portions interposed between two diametric portions;
a width defining the distance between said linear portions; and
a land length between about ⅛ inch and about ½ inch; and operating said extruder at a die pressure between about 500 and about 2000 pounds per square inch and at an extrudate temperature between about 320° F. to about 410° F.; and cutting said extrudate to produce said puffed snacks.

2. The method of claim 1 further comprising:
dehydrating said puffed snacks to a moisture content of between about 0.8% and about 2% by weight.

3. The method of claim 1 further comprising:
seasoning said puffed snacks.

4. The method of claim 1 wherein said ingredients further comprise:
about 35% to about 45% said rice flour; and
about 5% to about 10% soy protein isolate.

5. The method of claim 1 wherein said die pressure is between about 600 and about 1400 pounds per square inch.

6. The method of claim 1 wherein said extrudate temperature is between about 330° F. and about 400° F.

7. The method of claim 1 wherein said extruder further comprises a diffuser plate disposed behind said orifice.

8. The method of claim 1 wherein said land length is about ¼ inch.

9. The method of claim 1 wherein said diametric portions are about equal in size.

10. The method of claim 1 wherein each said diametric portion has a diameter and wherein each said linear portion has a length defining the distance between said diametric portions and wherein said width is less than each said diameter.

11. The method of claim 10 wherein one said diameter is between about 5% and about 15% smaller than the other said diameter.

12. The method of claim 1 wherein one said diametric portion is an elliptical portion.

13. The method of claim 1, wherein said ingredients are mixed in said extruder.

14. The method of claim 1 wherein said ingredients are premixed prior to being introduced into said extruder.

15. The method of claim 1, wherein said ground corn product is at least one of corn meal, corn flour and corn starch.

16. The method of claim 1, wherein said ingredients comprise a moisture content between about 15 percent to about 30 percent by weight on a wet basis.

17. The method of claim 1, wherein said extruder operates at least one screw at between about 200 revolutions per minute and about 450 revolutions per minute.

18. The method of claim 2 wherein said dehydrating comprises drying said puffed snacks in a drying oven at an oven temperature between about 250° F. and about 325° F.

19. The method of claim 2, wherein said dehydrating comprises frying said puffed snacks.

20. The method of claim 3, wherein said puffed snack comprises between about 10% and about 18% seasoning on a dry basis.

21. The method of claim 1 wherein said two approximately parallel linear portions are approximately equal in length.

\* \* \* \* \*